United States Patent
Chung et al.

(10) Patent No.: US 6,895,185 B1
(45) Date of Patent: May 17, 2005

(54) MULTI-PURPOSE OPTICAL FIBER ACCESS NETWORK

(75) Inventors: Yun Chur Chung, Taejun (KR); Hoon Kim, Kyungki-do (KR)

(73) Assignee: Korea Advanced Institute of Science and Technology, Taejun (KR)

( * ) Notice: Subject to any disclaimer, the term of this patent is extended or adjusted under 35 U.S.C. 154(b) by 600 days.

(21) Appl. No.: 09/644,910

(22) Filed: Aug. 24, 2000

(51) Int. Cl.$^7$ ........................ H04B 10/20; H04B 10/00; H04J 14/00
(52) U.S. Cl. ............................ 398/72; 398/58; 398/66; 398/67; 398/70; 398/71; 398/115; 398/116
(58) Field of Search ............................ 398/58, 66, 67, 398/70, 71, 72, 115, 116, 117; 725/129

(56) References Cited

U.S. PATENT DOCUMENTS

| | | | | |
|---|---|---|---|---|
| 5,550,666 A | * | 8/1996 | Zirngibl | 398/72 |
| 5,880,865 A | * | 3/1999 | Lu et al. | 398/72 |
| 5,978,117 A | * | 11/1999 | Koonen | 398/116 |

* cited by examiner

Primary Examiner—M. R. Sedighian
(74) Attorney, Agent, or Firm—Akin Gump Strauss Hauer & Feld, LLP

(57) ABSTRACT

The present invention relates to an optical fiber access network, and more particularly, to a multi-purpose optical fiber access network capable of accepting all services provided by hybrid wireline/wireless access network.

According to the present invention, in an optical fiber access network of double star structure where a central office/headend and several optical network units are connected through a splitting/combining device, a multi-purpose optical fiber access network capable of accepting not only wired telephone service, wired CATV and wired data service but also various kinds of wireless services including LMDS, WLL, PCS and so forth, in which LMDS local wireless base station is located in a place adjacent to the splitting/combining device, WLL local wireless base station is located in a place adjacent to the splitting/combining device, optical network unit connects the conventional wired network composed of said optical fiber access network, twisted pair and coaxial cable, telephone service, data service and CATV service are provided through the optical network unit and PCS local wireless base station is located in a place adjacent to the optical network unit, is provided.

6 Claims, 8 Drawing Sheets

MULTI-PURPOSE OPTICAL FIBER ACCESS NETWORK

TECHNICAL FIELD

The present invention relates to an optical fiber access network, and more particularly, to a multi-purpose optical fiber access network capable of accepting all services provided by wired network and hybrid wireline/wireless access network.

BACKGROUND OF THE INVENTION

Recently confronting information society, the information services needed by each subscriber are becoming various. As a result, not only voice services such as conventional telephone and personal communication service but also analog broadcasting signal service such as cable television and data service such as internet are required.

According as contemporary society is developed to information society, these requirements for communication will be more and more various and still more kinds of services will be required.

Meanwhile, in order to satisfy these needs for communication, communication service providers provide services by using various kinds of methods.

The access networks such as ADSL (Asymmetric Digital Subscriber Line) and HFC (Hybrid Fiber Coax) were introduced as the method using wired line and other access networks such as LMDS (Local Multipoint Distribution Service) and WLL (Wireless Local Loop) were introduced as the method using hybrid wireline/wireless access network.

Because these methods have each advantage and disadvantage, according to available transmission media of subscriber, transmission bandwidth, kind of services, initial investment cost of network equipment and so forth, those methods will be suitably used according to given condition of service provider, required condition of subscriber and so forth.

Accordingly, the access network using those access methods mixedly rather than certain access network will be dominant.

The access network for various kinds of communication and broadcasting services is basically composed of either only wired network or complex network using wired and wireless network.

Recently, as optical communication technologies are greatly improved, optical fiber is introduced in wired network. The introduction of optical fiber in wired network is inevitable result in order to overcome physical limitation (limited bandwidth and large signal loss) of the conventional communication network dependent on twisted pair and coaxial cable.

Particularly, as cost down of device and equipment related to optical communication makes optical communication system to be economical, many researches and developments for wired access service using optical fiber have been performed.

Also, these movements are rising to hybrid wireline/wireless access network. The subcarrier multiplexing optical transmission is the technology that transmits analog or digital signals which are carried in carrier by carrying to optical signal intactly.

By utilizing the subcarrier multiplexing optical transmission technology, the conventional wireless base station composed of modulator, demodulator and amplifier can be simply composed of optical-to-electrical converter, electrical-to-optical converter and amplifier. Accordingly, economical construction of wireless base station is possible.

Also, modem and system control part needed for the conventional wireless base station are moved to central office/headend. And because various kinds of functions including communication channel allocation of wireless base station and handoff is performed in central office/headend, the subcarrier multiplexing optical transmission technology can cope with varying communication quantity more flexibly.

According as optical fiber is introduced to wired network and hybrid wireline/wireless access network, the access service of wide band is possible and also centrally controlled hybrid wireline/wireless access network is possible.

However, in spite of these advantages, vast initial investment cost of equipment for optical device and optical fiber network which are still high cost leads to difficulty in construction of economical access service network.

In order to economically provide access service to subscribers, as many as possible parts of optical access network should be owned jointly.

Particularly, because the available bandwidth (>10 THz) of optical fiber is wide enough to accept conventional all kinds of access services, it is anticipated that the minutely described access service can be economically provided if several access services jointly own one optical fiber network by accepting those access services in one optical fiber network.

Accordingly, the development of multi-purpose optical fiber access network which accepts all kinds of access services in one access network and overcomes the current problem of duplicate construction of optical fiber network according to each service has been required.

SUMMARY OF THE INVENTION

An object of the present invention is to provide a multi-purpose optical fiber access network capable of accepting not only wired services including wired telephone service, wired CATV (Cable Television) service, and wired data service but also several wireless services such as LMDS (Local Multipoint Distribution Service), WLL (Wireless Local Loop), PCS (Personal Communication Service), etc.

In an optical fiber access network of double star structure, where a central office/headend and several optical network units are connected through a splitting/combining device, a multi-purpose optical fiber access network in which LMDS local wireless base station is located in a place adjacent to said splitting/combining device, WLL local wireless base station is located in a place adjacent to said splitting/combining device, optical network unit connects said optical fiber access network with the conventional wired network composed of twisted pair or coaxial cable and PCS local wireless base station is located a place adjacent to said optical network unit, is provided.

To achieve the object according to the present invention, in an optical fiber access network of double star structure, where a central office/headend and several optical network units are connected through a first splitting/combining device, a multi-purpose optical fiber access network is provided.

Preferably, the multi-purpose optical fiber access network is comprised of: a second splitting/combining device, which is placed in downstream transmission line between said central office/headend and the first splitting/combining device, for splitting/combining signals; a third splitting/combining device, which is placed in upstream transmission line between said central office/headend and the first splitting/combining device, for transmitting the signals to said central office/headend after adding signals; and a first local wireless base station for transmitting the signals to the air after receiving signals produced through subcarrier multiplexing method using intermediate frequency and then converting the signals to wireless aerial frequency signals, while being connected to the second splitting/combining device and for transmitting the signals to said central office/headend though the third splitting/combining device after converting the wireless aerial frequency signals received from the air to the signals of subcarrier multiplexing method using intermediate frequency.

In an optical fiber access network of double star structure, where a central office/headend and several optical network units are connected through a first splitting/combining device, a multi-purpose optical fiber access network is provided.

Preferably, a multi-purpose optical fiber access network is comprised of: a second splitting/combining device, which is placed in downstream transmission line between said central office/headend and the first splitting/combining device, for splitting/combining signals; a third splitting/combining device, which is placed in upstream transmission line between said central office/headend and the first splitting/combining device, for transmitting the signals to said central office/headend after adding signals; and a first local wireless base station for transmitting the signals to the air after receiving signals produced through subcarrier multiplexing method using intermediate frequency and then converting the signals to wireless aerial frequency signals, while being connected to the first splitting/combining device and for transmitting the signals to said central office/headend though the first splitting/combining device after converting the wireless aerial frequency signals received from the air to the signals of subcarrier multiplexing method using intermediate frequency.

More preferably, a multi-purpose optical fiber access network is composed of: a central office/headend for outputting the signals to downstream transmission line after converting signals which are inputted from the external to optical signals and then multiplexing them and for outputting the signals to the external after demultiplexing signals which are inputted from upstream transmission line and then converting them to electrical signals; a first splitting/combining means for outputting a portion of the optical signals after transmitting the optical signals output from said central office/headend through the downstream transmission line; a first wireless base station for outputting the optical signals inputted from the first splitting/combining means to wireless line after converting signals to electrical signals and for outputting the signals inputted from the wireless line to upstream transmission line after converting signals to optical signals; a second splitting/combining means for outputting the optical signals inputted from the first splitting/combining means to several output ports after splitting/combining them and for outputting several optical signals inputted from the external after adding them;

a first multiplexing means for outputting the optical signals inputted from the second splitting/combining means and the signals inputted through the first wireless base station to upstream transmission line after multiplexing them; a wavelength division multiplexing part for outputting the signals inputted from the second splitting/combining means after demultiplexing them and for outputting the inputted signals to the second splitting/combining means after multiplexing them; a second wireless base station for outputting the personal communication signals out of the signals inputted from said wavelength division multiplexing part to the wireless line after converting them to electrical signals and for outputting the signals inputted from the wireless line to said wavelength division multiplexing part after converting them to optical signals; and an optical network unit for outputting the signals inputted from said wavelength division multiplexing part to wired line after converting them to electrical signals and then demodulating them and for outputting the cable modem signals and digital data service signals inputted from the wired line to said wavelength division multiplexing part after converting them to optical signals.

Preferably, a multi-purpose optical fiber access network is composed of: an LMDS/WLL modulation/demodulation part for outputting the LMDS signals and WLL signals carried by the carrier to downstream transmission line after electrically multiplexing them and then modulating them to the first allocated wavelength and for outputting the LMDS signals and WLL signals transmitted through upstream transmission line to the external after converting them to electrical signals; a data signal modulation/demodulation part for outputting the data service signals to downstream transmission line after modulating them to the second allocated wavelength and for outputting the data service signals transmitted through upstream transmission line after demodulating them; a CATV/PCS modulation/demodulation part for outputting the PCS signals and CATV signals carried by the carrier to downstream transmission line after electrically multiplexing them and then modulating them to the third allocated wavelength and for outputting the PCS signals transmitted through upstream transmission line after converting them to electrical signals; a first wavelength division multiplexing part for outputting the signals inputted from said LMDS/WLL modulation/demodulation part, said data signal modulation/demodulation part and said CATV/PCS modulation/demodulation part after wavelength division multiplexing them and for outputting the signals inputted from upstream transmission line to said LMDS/WLL modulation/demodulation part, said data signal modulation/demodulation part and said CATV/PCS modulation/demodulation part after demultiplexing them; a splitting/combining device for outputting a portion of the transmitted optical signals while being split after transmitting the optical signals output from the first wavelength division multiplexing part through downstream transmission line; an LMDS/WLL wireless base station for outputting only the first allocated wavelength signals out of the signals inputted from said splitting/combining device to wireless line after converting them to electrical signals and for outputting the LMDS signals and WLL signals inputted from the wireless line to upstream transmission line after electrically multiplexing them and then converting them to optical signals; a 1×N add-drop multiplexing part for outputting the optical signals inputted from said splitting/combining device to several output ports while being split and for outputting several optical signals inputted from the external while being added; a second wavelength division multiplexing part for outputting the optical signals inputted through said 1×N add-drop multiplexing part and the signals inputted through said LMDS/WLL wireless base station to upstream transmission line after multiplexing them; a third wavelength division multiplexing part for outputting the PCS signals, CATV signals and data service signals inputted from said 1×N add-drop multiplexing part after demultiplexing them and for outputting the inputted PCS signals and data service signals to said 1×N add-drop multiplexing part after multiplexing them; a PCS wireless base station for outputting the optical signals inputted from the third wavelength division multiplexing part to the wireless line after converting them to electrical signals and for outputting the PCS signals inputted from the wireless line to the third wavelength division multiplexing part after converting them to optical signals; and an optical network unit for outputting the data service signals and CATV signals inputted from the third wavelength division multiplexing part to wired line after converting them to electrical signals and then demodulating them and for outputting the data service signals inputted from the wired line to the third wavelength division multiplexing part after converting them to optical signals.

More preferably, a multi-purpose optical fiber access network is composed of: an LMDS signal modulation/demodulation part for outputting the LMDS signals carried by the carrier to downstream transmission line after modulating them to the first allocated wavelength and for outputting the LMDS signals transmitted through upstream transmission line to the external after converting them to electrical signals; a WLL signal modulation/demodulation part for outputting the WLL signals carried by the carrier to downstream transmission line after modulating them to the second allocated wavelength and for outputting the WLL signals transmitted through upstream transmission line to the external after converting them to electrical signals; a data service signal modulation/demodulation part for outputting the data service signals carried by the carrier to downstream transmission line after modulating them to the third allocated wavelength and for outputting the data service signals transmitted through upstream transmission line after demodulating them; a PCS signal modulation/demodulation part for outputting the PCS signals carried by the carrier to downstream transmission line after modulating them to the fourth allocated wavelength and for outputting the PCS signals transmitted through upstream transmission line after converting them to electrical signals; a CATV signal modulation/demodulation part for outputting the CATV signals carried by the carrier to downstream transmission line after modulating them to the fifth allocated wavelength and for outputting the cable modem service signals transmitted through upstream transmission line after converting them to electrical signals; a first wavelength division multiplexing part for outputting said signals output to downstream transmission line after wavelength division multiplexing them and for outputting the signals inputted from upstream transmission line to said modulation/demodulation parts after demultiplexing them; a splitting/combining device for outputting a portion of the transmitted optical signals while being split after transmitting the optical signals output from the first wavelength division multiplexing part through downstream transmission line; an LMDS/WLL wireless base station for outputting only the first and the second allocated wavelength signals out of the signals inputted from said splitting/combining device to the wireless line after converting them to electrical signals and for outputting the LMDS signals and WLL signals inputted from the wireless line to upstream transmission line after converting them to optical signals; a 1×N add-drop multiplexing part for outputting the optical signals inputted from said splitting/combining device to several output ports while being split and for outputting several optical signals inputted from the external while being added; a multiplexing device for outputting the optical signals inputted through said 1×N add-drop multiplexing part and the signals inputted through said LMDS/WLL wireless base station to upstream transmission line after multiplexing them; a second wavelength division multiplexing part for outputting the signals inputted from said 1×N add-drop multiplexing part after demultiplexing them and for outputting the inputted PCS signals, cable modem signals and data service signals to said 1×N add-drop multiplexing part after multiplexing them; a PCS wireless base station for outputting the optical signals inputted from the second wavelength division multiplexing part to wireless line after converting them to electrical signals and for outputting the PCS signals inputted from the wireless line to the second wavelength division multiplexing part after converting them to optical signals; and an optical network unit for outputting the data service signals and CATV signals inputted from the second wavelength division multiplexing part to wired line after converting them to electrical signals and then demodulating them and for outputting the data signals and cable modem signals inputted from the wired line to the second wavelength division multiplexing part after converting each of them to optical signals.

It is preferable that the multi-purpose optical fiber access network is composed of: an LMDS/WLL signal modulation/demodulation part for outputting the LMDS signals and WLL signals carried by the carrier to downstream transmission line after electrically multiplexing them and then modulating them to the first allocated wavelength and for outputting the LMDS signals and WLL signals transmitted through upstream transmission line to the external after converting them to electrical signals; a CATV/PCS signal modulation/demodulation part for outputting the PCS signals and CATV signals carried by the carrier to downstream transmission line after electrically multiplexing them and then modulating them to the second allocated wavelength and for outputting the PCS signals transmitted through upstream transmission line after converting them to electrical signals; a data signal modulation/demodulation part for outputting the data service signals to downstream transmission line after modulating them to several wavelengths, exclusive of said wavelengths and for outputting the data service signals transmitted through upstream transmission line after demodulating them; a first wavelength division multiplexing part for outputting the signals inputted from said LMDS/WLL signal modulation/demodulation part, said CATV/PCS signal modulation/demodulation part and said data service signal modulation/demodulation part after wavelength division multiplexing them and for outputting the signals inputted from upstream transmission line to said LMDS/WLL signal modulation/demodulation part, said CATV/PCS signal modulation/demodulation part and said data service signal modulation/demodulation part after demultiplexing them; a splitting/combining device for outputting a portion of the transmitted optical signals while being split after transmitting the optical signals output from the first wavelength division multiplexing part through downstream transmission line; an LMDS/WLL wireless base station for outputting only the first allocated wavelength signals out of the signals inputted from said splitting/combining device to the wireless line after converting them to electrical signals and for outputting the LMDS signals and WLL signals inputted from the wireless line to upstream transmission line after electrically multiplexing them and then converting them to optical signals; a 1×N add-drop multiplexing part for outputting several optical signals inputted from the external while being added, which acts as star splitter for the second allocated wavelength out of the optical signals inputted from said splitting/combining device and acts as arrayed waveguide grating for other wavelengths; a multiplexing device for outputting the optical signals inputted through said 1×N add-drop multiplexing part and the signals inputted through said LMDS/WLL wireless base station to upstream transmission line after multiplexing them; a second wavelength-division-multiplexing part for outputting the signals inputted from said 1×N add-drop multiplexing part after demultiplexing them and for outputting the inputted PCS signals and data service signals to said 1×N add-drop multiplexing part after multiplexing them; a PCS wireless base station for outputting the optical signals inputted from the second wavelength division multiplexing part to the wireless line after converting them to electrical signals and for outputting the PCS signals inputted from the wireless line to the second wavelength division multiplexing part after converting them to optical signals; and an optical network unit for outputting the data service signals and CATV signals inputted from the second wavelength division multiplexing part to wired line after converting them to electrical signals and then demodulating them and for outputting the data signals inputted from the wired line to the second wavelength division multiplexing part after converting them to optical signals.

It is more preferable that the multi-purpose optical fiber access network is composed of: an LMDS/WLL signal modulation/demodulation part for outputting the LMDS signals and WLL signals carried by the carrier to downstream transmission line-after electrically multiplexing them and then modulating them to the first allocated wavelength and for outputting the LMDS signals and WLL signals transmitted through upstream transmission line to the external after converting them to electrical signals; a data signal modulation/demodulation part for outputting the data service signals to downstream transmission line after modulating them to the second allocated wavelength and for outputting the data service signals transmitted through upstream transmission line after demodulating them; a CATV/PCS modulation/demodulation part for outputting the PCS signals and CATV signals carried by the carrier to downstream transmission line after electrically multiplexing them and then modulating them to the third allocated wavelength and for outputting the PCS signals transmitted through upstream transmission line after converting them to electrical signals; a first wavelength division multiplexing part for outputting the signals inputted from said LMDS/WLL signal modulation/demodulation part, said CATV/PCS signal modulation/demodulation part and said data signal modulation/demodulation part after wavelength division multiplexing them and for outputting the signals inputted from upstream transmission line to said LMDS/WLL signal modulation/demodulation part, said CATV/PCS signal modulation/demodulation part and said data signal modulation/demodulation part after demultiplexing them; a first splitting/combining device for outputting the optical powers of the transmitted optical signals while being split after transmitting the optical signals output from the first wavelength division multiplexing part through downstream transmission line; an LMDS/WLL wireless base station for outputting only the first allocated wavelength signals out of the signals inputted from the first splitting/combining device to the wireless line after converting them to electrical signals and for outputting the LMDS signals and WLL signals inputted from the wireless line to upstream transmission line after electrically multiplexing them and then converting them to optical signals; a second wavelength division multiplexing part for outputting the optical signals inputted from the first splitting/combining device after wavelength division demultiplexing them and for outputting the inputted upstream transmission signals to upstream transmission line after wavelength division multiplexing them; a first electrical-to-optical/optical-to-electrical converting part for outputting the optical signals inputted from the second wavelength-division multiplexing part after converting them to electrical signals and electrically demultiplexing them and then modulating the PCS signals to the first allocated wavelength, for outputting the CATV signals after modulating them to the second allocated wavelength, and for outputting the data signals after modulating them to the third allocated wavelength; a second splitting/combining device for outputting the optical signals inputted from the first electrical-to-optical/optical-to-electrical converting part to several output ports after wavelength division multiplexing them and then splitting/combining them and for outputting several optical signals inputted from the external after adding them and then wavelength division demultiplexing them; a second electrical-to-optical/optical-to-electrical converting part for outputting the optical signals inputted from the second splitting/combining device to the second wavelength division multiplexing part after converting them to electrical signals and electrically demultiplexing them and then modulating the PCS signals to the first allocated wavelength and for outputting the cable modem signals and data signals to the second wavelength division multiplexing part after electrically multiplexing them and then modulating them to the second allocated wavelength; a multiplexing device for outputting the optical signals inputted from the second wavelength division multiplexing part and the signals inputted through said LMDS/WLL wireless base station to upstream transmission line after multiplexing them; a third wavelength division multiplexing part for outputting the signals inputted from the second splitting/combining means after demultiplexing them and for outputting the inputted PCS signals, cable modem signals and data service signals to the second splitting/combining device after multiplexing them; a PCS wireless base station for outputting the optical signals inputted from the third wavelength division multiplexing part to wireless line after converting them to electrical signals and for outputting the PCS signals inputted from the wireless line to the third wavelength division multiplexing part after converting them to optical signals; and an optical network unit for outputting the data service signals and CATV signals inputted from the third wavelength division multiplexing part to wired line after converting them to electrical signals and then demodulating them and for outputting the data signals and cable modem signals inputted from the wired line to the third wavelength division multiplexing part after converting each of them to optical signals.

Preferably, The multi-purpose optical fiber access network is composed of: an LMDS/WLL signal modulation/demodulation part for outputting the LMDS signals and WLL signals carried by the carrier to downstream transmission line after electrically multiplexing them and then modulating them to the first allocated wavelength and for outputting the LMDS signals and WLL signals transmitted through upstream transmission line to the external after converting them to electrical signals; a data signal modulation/demodulation part for outputting the data service signals to downstream transmission line after modulating them to the second allocated wavelength and for outputting the data service signals transmitted through upstream transmission line after demodulating them; a CATV/PCS modulation/demodulation part for outputting the PCS signals and CATV signals carried by the carrier to downstream transmission line after electrically multiplexing them and then modulating them to the third allocated wavelength and for outputting the PCS signals transmitted through upstream transmission line after converting them to electrical signals; a first wavelength division multiplexing part for outputting the signals inputted from said LMDS/WLL signal modulation/demodulation part, said CATV/PCS signal modulation/demodulation part and said data signal modulation/demodulation part to downstream transmission line after wavelength division multiplexing them and for outputting the signals inputted from upstream transmission line to said LMDS/WLL signal modulation/demodulation part, said CATV/PCS signal modulation/demodulation part and said data signal modulation/demodulation part after demultiplexing them; a splitting/combining device for outputting a portion of the optical signals transmitted from the first wavelength division multiplexing part through downstream transmission line after splitting them; an LMDS/WLL wireless base station for outputting only the first allocated wavelength signals out of the signals inputted from said splitting/combining device to the wireless line after converting them to electrical signals and for outputting the LMDS signals and WLL signals inputted from the wireless line to upstream transmission line after electrically multiplexing them and then converting them to optical signals; a second wavelength division multiplexing part for outputting the optical signals inputted from said splitting/combining device after wavelength division demultiplexing them and for outputting the inputted upstream transmission signals to upstream transmission line after wavelength division multiplexing them; a first electrical-to-optical/optical-to-electrical converting part for outputting the optical signals inputted from the second wavelength division multiplexing part after converting them to electrical signals and electrically demultiplexing them and then modulating the PCS signals to several light sources with the first allocated wavelength, for outputting the CATV signals after modulating them to several light sources with the second allocated wavelength, and for outputting the data signals after modulating them to light source with the third allocated wavelength; a third wavelength division multiplexing part for outputting the optical signals inputted from the first electrical-to-optical/optical-to-electrical converting part after wavelength division multiplexing them and for outputting several optical signals inputted from the external after wavelength division demultiplexing them; a second electrical-to-optical/optical-to-electrical converting part for outputting the optical signals inputted from the third wavelength division multiplexing part to the second wavelength division multiplexing part after converting them to electrical signals and electrically multiplexing them and then modulating the PCS signals to the first allocated wavelength, for outputting the cable modem signals and data signals to the second wavelength division multiplexing part after electrically multiplexing them and then modulating them to the second allocated wavelength; a multiplexing device for outputting the optical signals inputted through the second wavelength-division multiplexing part and the signals inputted from said LMDS/WLL wireless base station to upstream transmission line after multiplexing them; a fourth wavelength division multiplexing part for outputting the signals inputted from the third wavelength division multiplexing part after demultiplexing them and for outputting the inputted PCS signals, cable modem signals and data service signals to the third wavelength-division-multiplexing part after multiplexing them; a PCS wireless base station for outputting the optical signals inputted from the fourth wavelength division multiplexing part to wireless line after converting them to electrical signals and for outputting the PCS signals inputted from the wireless line to the fourth wavelength division multiplexing part after converting them to optical signals; and an optical network unit for outputting the data service signals and CATV signals inputted from the fourth wavelength division multiplexing part to wired line after converting them to electrical signals and then demodulating them and for outputting the data signals and the cable modem signals inputted from the wired line to the fourth wavelength division multiplexing part after converting them to optical signals.

BRIEF DESCRIPTION OF THE DRAWINGS

The embodiments of the present invention will be explained with reference to the accompanying drawings, in which.

DETAILED DESCRIPTION OF THE INVENTION

Referring to the accompanying drawings, "multi-purpose optical fiber access network" according to embodiments of the present invention is described in detail.

Figure 1:
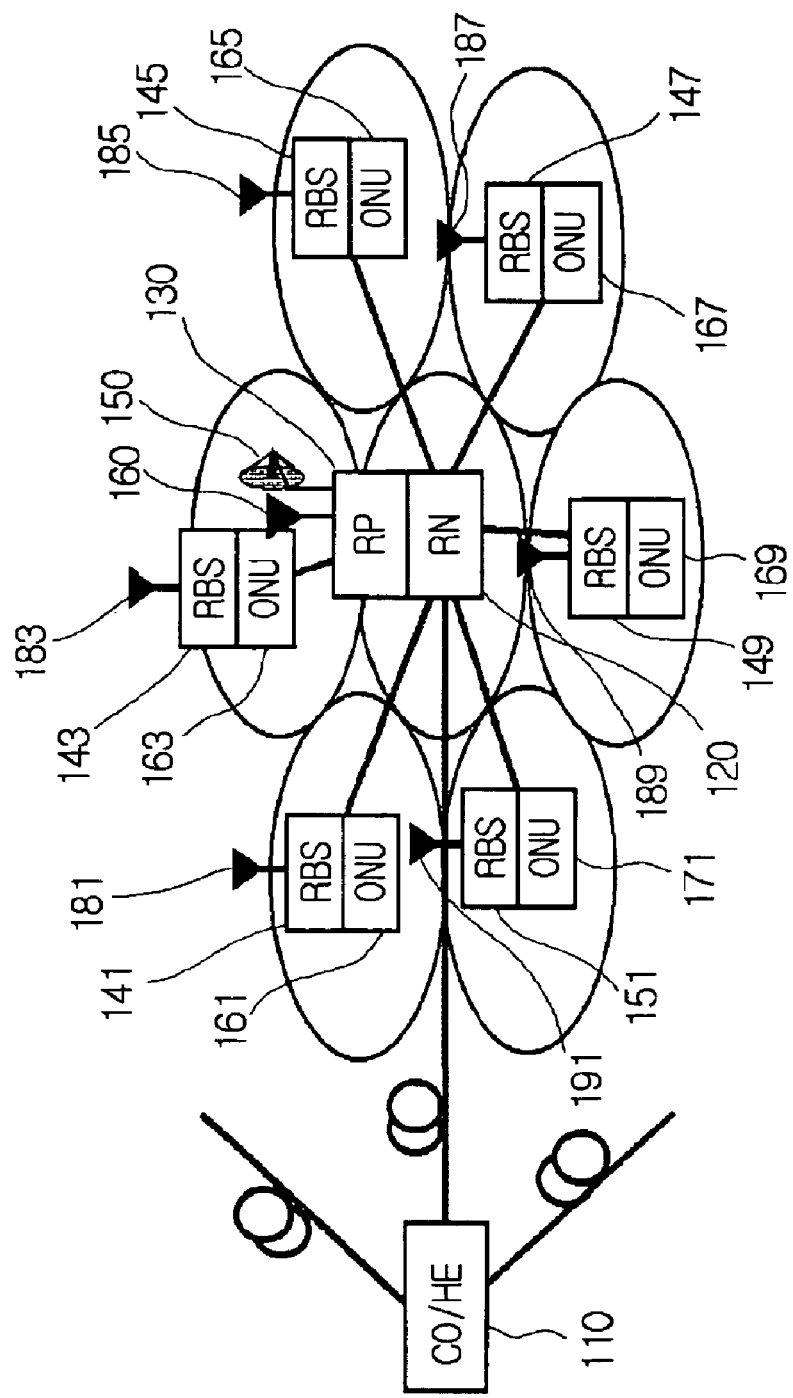
FIG. 1 is a geographical compositional drawing illustrating a multi-purpose optical fiber access network according to a preferred embodiment of the present invention.

FIG. 1 is a geographical compositional drawing illustrating a multi-purpose optical fiber access network according to a preferred embodiment of the present invention.

As illustrated in FIG. 1, multi-purpose optical fiber access network according to the preferred embodiment of the present invention is constructed by a central office/headend (CO/HE) 110, a remote node (RN) 120, a radio port (RP) 130, remote base stations (RBS) 141, 143, 145, 147, 149, 151, and optical network units (ONU) 161, 163, 165, 167, 169, 171.

The central office/headend 110 performs not only in charge of insertion of communication protocol and switching of signal in order to split signal to each subscriber or send the signal transmitted by each subscriber to other places but also splitting of broadcasted signal.

In the subscriber network, the remote base stations 141, 143, 145, 147, 149, 151 are placed between the central office/headend 110 and several subscriber terminals and add or drop the signal.

The optical network units 161, 163, 165, 167, 169, 171 which are connecting an optical fiber network with the conventional twisted pair network convert the signal of the optical fiber network in order to be suitable for the twisted pair network or convert the signal of the twisted pair network in order to be fitted for the optical fiber network.

As a place converting wired signal to wireless signal and vice versa, the radio port 130 is correspondent to interface of wired network and wireless network.

In the present invention, the radio port 130 transmits LMDS signal and WLL signal transmitted from the central office/headend 110 to the air through an antenna 150 and receives wireless LMDS and WLL signal and converts them to optical signal and then transmits to the central office/headend 110.

Also, the remote base stations 141, 143, 145, 147, 149, 151 convert wired signal to wireless signal and vice versa as the radio port 130 and are correspondent to interface of wired network and wireless network.

In the present invention, the remote base stations 141, 143, 145, 147, 149, 151 transmit the PCS signal and cellular signal which are transmitted from the central office/headend 110 to the air through the antennas 160, 181, 185, 187, 189, 191 and then transmit to the central office/headend 110 after receiving the PCS signal and cellular signal and then converting to optical signals.

The radio port 130 constitutes single star structure by being directly connected with the central office/headend 110 through optical fiber.

On the other hand, the remote base stations 141, 143, 145, 147, 149, 151 and optical network units 161, 163, 165, 167, 169, 171 constitute double star structure by being connected with the central office/headend 110 through the remote node 120.

Generally, double star structure uses less optical fiber as compared with single star structure, so in the case of the cable television service, data service and personal communication service provided through the optical network units 161, 163, 165, 167, 169, 171 connected by double star structure, initial investment cost of equipment can be greatly reduced.

The construction of said radio port 130 in the place adjacent to the remote node 120 can make economical construction of access network by jointly owning the optical fiber extending from the central office/headend 110 to the radio port 130 with optical fiber extending from the central office/headend 110 to the remote node 120.

Although the optical fiber has different reaching distances for each access service, the similarity in service of LMDS and WLL and the similarity of PCS service, cellular service, cable television service and data service (ADSL and cable modem service) make the optical fiber network have these geographical composition.

By studying in detail, generally the radius of wireless network which a local wireless base station covers is approximately 2~3 km in the case of LMDS and WLL service and the radius of wireless network is approximately 1 km in the case of PCS and cellular service.

Accordingly spatially one radio port 130 spatially exists for 4~9 PCS/cellular remote base stations 141, 143, 145, 147, 149, 151.

And the service region of the optical network units 161, 163, 165, 167, 169, 171 providing cable television service and data service such as ADSL and cable modem is different according to the density of subscribers, however in the case of providing service to about 1000 subscribers the radius is about 1 km.

Because the radius that the optical network units 161, 163, 165, 167, 169, 171 covers is nearly equal to the radius that the PCS remote base stations 141, 143, 145, 147, 149, 151 covers, the construction of economical access network is achieved by locating the optical network units 161, 163, 165, 167, 169, 171 and the PCS remote base stations 141, 143, 145, 147, 149, 151 in adjacent place.

Figure 2:
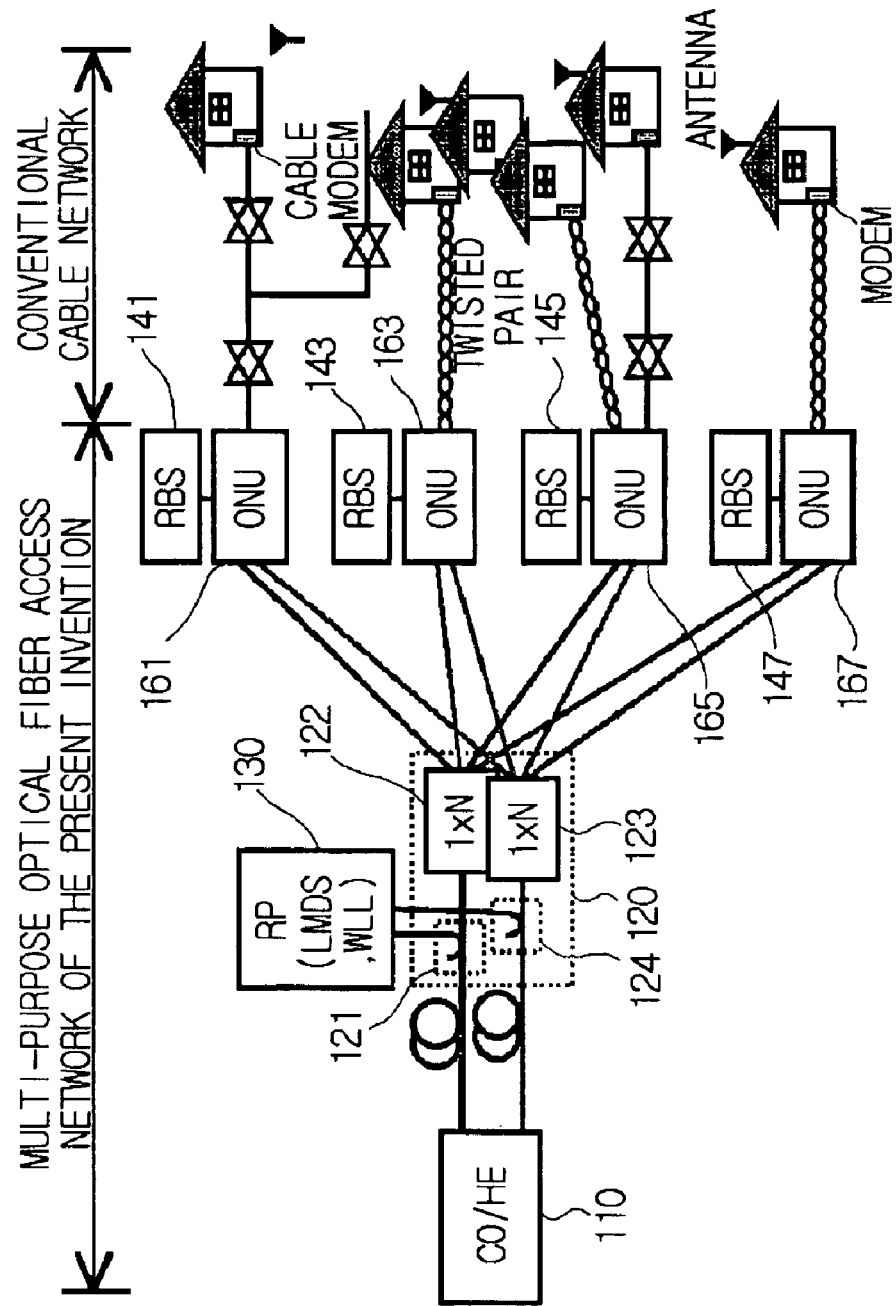
FIG. 2 is a logical compositional drawing illustrating a multi-purpose optical fiber access network according to preferred embodiment of the present invention.

FIG. 2 is a logical compositional drawing illustrating a multi-purpose optical fiber access network according to a preferred embodiment of the present invention.

As illustrated in FIG. 2, the logical composition of a multi-purpose optical fiber access network according to the preferred embodiment of the present invention is constructed by a central office/headend (CO/HE) 110, a remote node (RN) 120, a radio port (RP) 130, remote base stations (RBS) 141, 143, 145, 147 and optical network units (ONU) 161, 163, 165, 167. And for downstream transmission (the transmission from a central office/headend to a radio port, a remote base station, or an optical network unit) and upstream transmission (the transmission from a radio port, a remote base station, or an optical network unit to a central office/headend) uses different optical fibers respectively.

The remote node 120 is equipped with 1×2 splitting/combining devices 121, 124 and 1×N splitting/combining devices 122, 123.

By either splitting/combining the downstream signal transmitted from the central office/headend 110 and then splitting/combining that signal to the 1×N splitting/combining device 122 or the radio port 130, or by adding the signals of the 1×N splitting/combining device 123 and the radio port 130, the 1×2 splitting/combining devices 121, 124 connect to the central office/headend 110.

And by either splitting/combining the downstream signal transmitted from the central office/headend 110 to the remote base stations 141, 143, 145, 147 and the optical network units 161, 163, 165, 167 or by adding the signals of the remote base stations 141, 143, 145, 147 and the optical network units 161, 163, 165, 167, the 1×N splitting/combining device 122 connect to the central office/headend 110.

Meanwhile, in order to operate each access service independently, basically different wavelength is allocated to each access service.

And the service signal allocated with peculiar wavelength can be added or dropped without interference by using wavelength division multiplexer or wavelength division demultiplexer having small crosstalk.

Therefore, the central office/headend 110, the remote base stations 141, 143, 145, 147 and the optical network units 161, 163, 165, 167 should include wavelength division multiplexer and wavelength division demultiplexer capable of adding or splitting/combining the wavelength according to each service.

However, for economical construction of optical fiber access network two or more access services can be provided to one wavelength.

In the case of providing two or more access services to one wavelength each access service has independency by using subcarrier multiplexing method.

In the case of wireless signals such as LMDS, WLL and PCS signals, these service signals are transmitted by baseband format and transmitted to the air after being adaptively modulated to wireless aerial signal in the local wireless base station (radio port 130 and remote base stations 141, 143, 145, 147) in downstream transmission and can be transmitted after demodulating the wireless aerial signal received from the local wireless to baseband signal in upstream transmission.

However, these conventional methods have a disadvantage that due to the need of complex modulation/demodulation electronic equipment economical construction of the wireless base station is difficult.

On the other hand, in the case of using subcarrier multiple access method, although there is advantage that the local wireless base station is simply constructed by optical-to-electrical converter, electrical-to-optical converter and power amplifier, there are disadvantages that the signal is easily deteriorated by the dispersion of the optical fiber and the frequency requirement of the optical device is complicated according as the frequency of the subcarrier goes high as compared with the conventional methods.

These disadvantages can be solved by transmitting after converting the frequency of the subcarrier to lower than the frequency that practically used.

In spite of disadvantage that frequency converter is required in the wireless base station, above mentioned two problems can be solved by transmitting using the intermediate frequency which is lower than the practical wireless aerial frequency.

The optical network units 161, 163, 165, 167 transmit the received data signals and cable television signals to each subscriber through the conventional twisted pair network after adaptively modulating them to the characteristic of subscriber's modem.

The central office/headend 110 and the optical network units 161, 163, 165, 167 utilize either Time Division Multiple Access (TDMA) or Wavelength Division Multiple Access (WDMA) method for the transmission of data signal.

In the case of PCS signal, the central office/headend 110 converts the signal to intermediate frequency in order to differentiate each PCS local wireless base station 141, 143, 145, 147 and then transmits the signal.

The PCS local wireless base station 141, 143, 145, 147 receive the signal out of the signals transmitted from the central office/headend 110 by filtering the frequency signal corresponding to its own.

This frequency selection of the PCS local wireless base station 141, 143, 145, 147 is done by the command of the control signal sent by the central office/headend 110.

The PCS local wireless base station 141, 143, 145, 147 transmit the received intermediate frequency signal to the air though antenna after converting it to aerial frequency signal.

Also, the transmission of the PCS upstream signal is transmitted by the same method as the transmission of the downstream signal described previously.

For the transmission of the PCS upstream signal, each PCS local wireless base station 141, 143, 145, 147 transmits to the central office/headend 110 by carrying the signal to different intermediate frequencies.

The central office/headend 110 differentiates the PCS local wireless base station 141, 143, 145, 147 by using the intermediate frequency of received signal.

Figure 3:
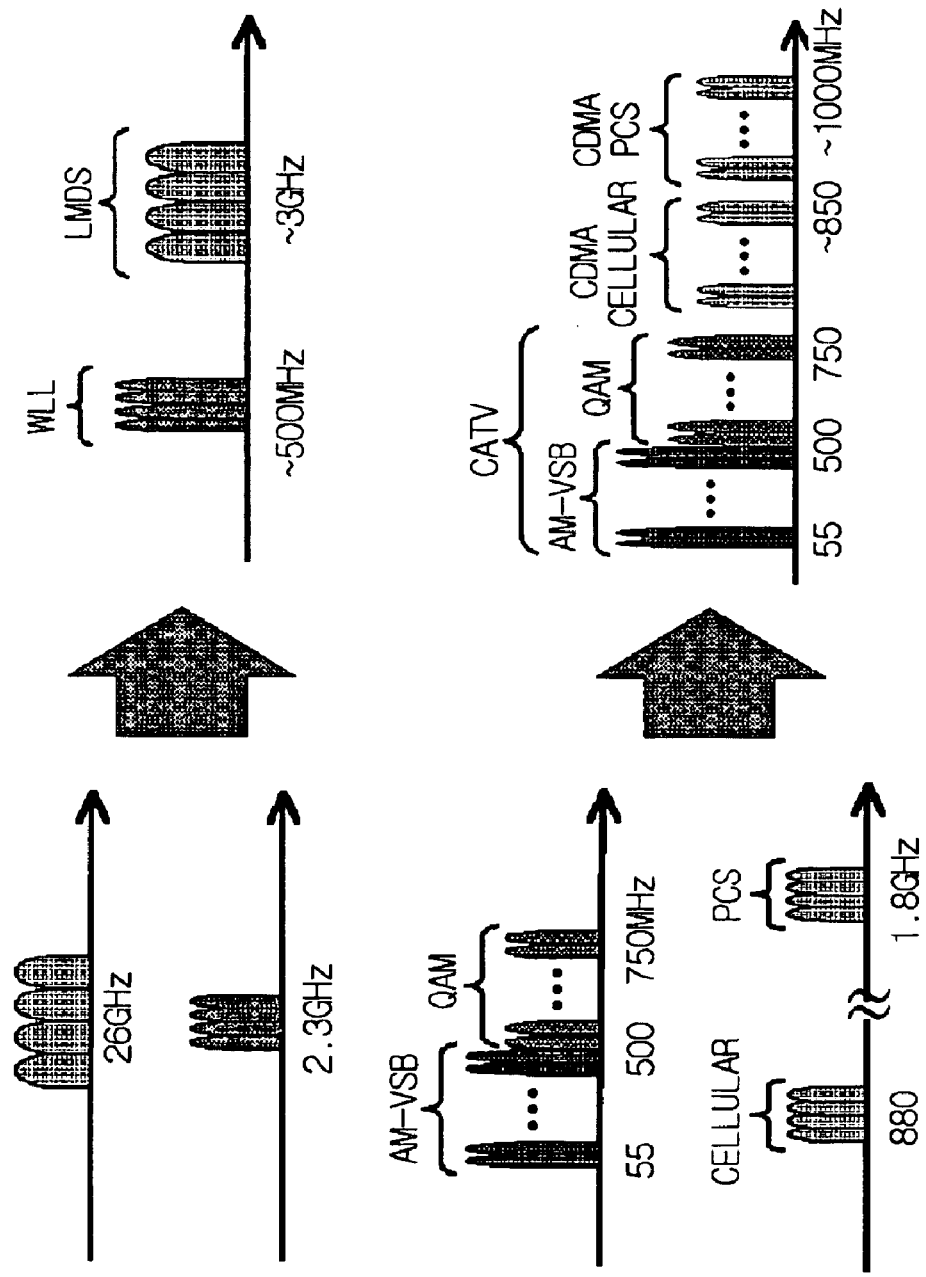
FIG. 3 is an explanatory drawing for the conversion of intermediate frequency used in the present invention.

FIG. 3 is an explanatory drawing for the conversion of intermediate frequency used in the present invention.

For economical construction of access network, in the case that LMDS signal and WLL signal are transmitted to a light source after electrically multiplexing them by using subcarrier multiplexing method, and CATV signal and PCS signal are transmitted to another light source after electrically multiplexing them by using subcarrier multiplexing method, FIG. 3 is an example showing the difference of the spectrum of practical frequency and the frequency used in the optical access network of the present invention.

The left side drawing of FIG. 3 is practical frequency spectrum of each access and the frequency transmitted or received by subscriber.

In the case of Korea, for LMDS downstream transmission 25.5~27.5 GHz is used and for upstream transmission 24.25~24.75 GHz is used. And for WLL downstream transmission 2.37~2.40 GHz and for WLL upstream transmission 2.30~2.33 GHz is used.

Also, in the case of the PCS for downstream transmission 1.84~1.87 GHz and for upstream transmission 1.75~1.78 GHz is used.

Because the frequency allocation of these hybrid wireline/wireless access services is used by establishing as standard in each country, the frequency bandwidths are different from each country.

As shown in the left side drawing of FIG. 3, in the case of the wired CATV signal, analog AM-VSB signal is distributed in the bandwidth of 50~500 MHz and QAM signal is distributed in the bandwidth of 500~750 MHz.

Although the CATV signal is composed of only analog AM-VSB signal at present, the CATV signal will be constructed in the mixed format of analog AM-VSB signal and QAM signal sooner or later in order to provide more channels to subscriber.

Because the bandwidth of 500~750 MHz for the digital CATV broadcasting signal is jointly owned with the downstream signal of the cable modem, downstream cable modem signal is transmitted after being inserted into the bandwidth which is not used out of the digital CATV broadcasting signals of 500~750 MHz.

That is, because the CATV service and downstream cable modem service are provided by the same service provider, the CATV signal and downstream cable modem signal can be transmitted by using same light source.

In the case of transmitting without frequency conversion of practically transmitted or received signal by subscriber as the left side drawing of FIG. 3, there is an advantage of not requiring frequency converter in the central office/headend and local wireless base station.

However, in the case of transmitting without conversion of practical frequency of each access, there are disadvantages that the frequency requirement of the optical device in the central office/headend and local wireless base station is complicated and the signal quality is deteriorated by dispersion of the optical fiber.

In order to overcome those problems, the multi-purpose optical fiber access network of the present invention transmits the signal by using lower intermediate frequency than the frequency used in practical access service.

The right side drawing of FIG. 3 shows frequency allocation of each access service when transmitting by using intermediate frequency.

As shown in drawing, LMDS and WLL service use intermediate frequency of about 2~4 GHz and 500 MHz band instead of the practically used frequencies of 26 GHz and 2.3 GHz.

Also, two access services (LMDS and WLL) using different intermediate frequencies are transmitted by one light source by using subcarrier multiplexing method. Because two services' signals are provided by one light source by using these low frequencies as intermediate frequencies and using subcarrier multiplexing method, it is possible to use the optical device of loose frequency requirement and to construct economical optical fiber access network by using one light source in order to provide two service.

The PCS service and cellular service uses intermediate frequency bandwidth of 1000 MHz and 800 MHz respectively. On the other hand, the CATV service does not use intermediate frequency.

Economical access service can be provided by transmitting CATV service, PCS service and cellular service by one light source by using subcarrier multiplexing method as the LMDS and WLL services.

In the case of the PCS and cellular services, the transmission method using intermediate frequency has advantages of not only avoiding signal deterioration by the loose frequency requirement and dispersion of the optical device but also being able to differentiate local wireless base station in double star structure.

The central office/headend can differentiate local wireless base station by transmitting using different intermediate frequencies in each local wireless base station.

Figure 4:
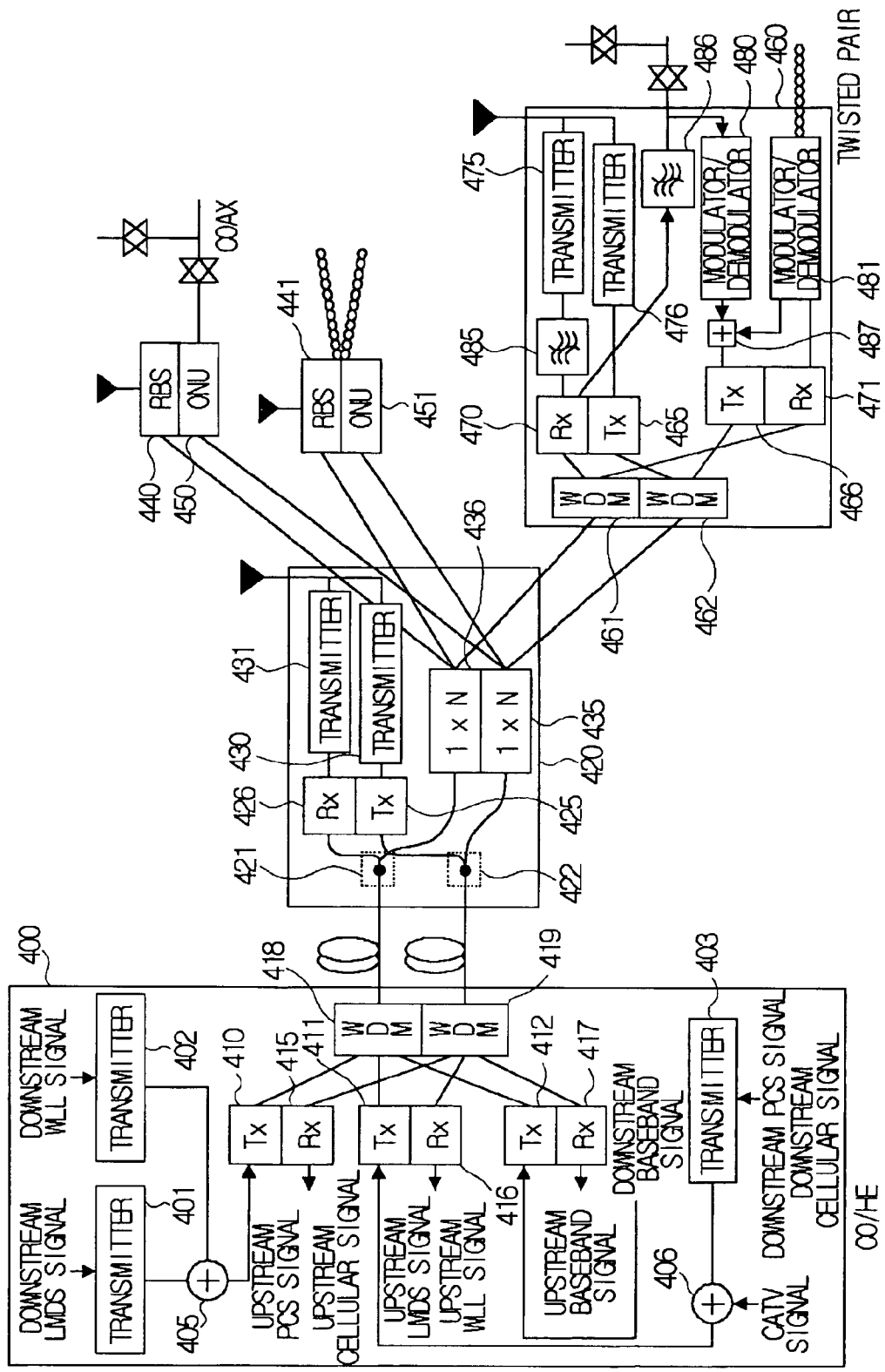
FIG. 4 is a node block compositional drawing of a multi-purpose optical fiber access network according to a first embodiment of the present invention.

FIG. 4 is a node block compositional drawing of a multi-purpose optical fiber access network according to a first embodiment of the present invention. FIG. 4 shows the case of being composed by using three wavelengths.

If each wavelength are allocated to each access, the independency of each access service is guaranteed. However lots of light sources are needed to that extent and complicated technology such as wavelength stabilization is also needed. Therefore the construction of economical access network is difficult.

For the construction of economical access network, the embodiment is the case that provides said access service with three wavelengths by using the first allocated wavelength for LMDS service and WLL service, the second allocated wavelength for CATV service and PCS service and the third allocated wavelength for data service.

First, in downstream transmission for LMDS service and WLL service wavelength of 1.3 μm, for CATV service and PCS service wavelength of 1.53 μm, and for data service wavelength of 1.55 μm is allocated respectively.

Herein, said three wavelengths are generated by each transmitter 410, 411, 412 and the wavelengths generated by said transmitter 410, 411, 412 are multiplexed through the wavelength division multiplexer 418 of the central office/headend 400 which is composed of 1.3/1.5 μm wavelength division multiplexer and 1.53/1.55 μm wavelength division multiplexer and then transmitted to downstream transmission line.

In the case of providing two or more access services with one wavelength such as LMDS and WLL service and CATV and PCS service, two access services are added or dropped by using different subcarrier each other.

The LMDS/WLL signal transmitted through optical transmission line is divided by using 1.3/1.5 μm wavelength division multiplexer 421 in remote node 420. And the divided LMDS/WLL service signal is converted into electrical signal by an optical receiver 426 and converted into wireless frequency through frequency converter 431 and then transmitted to the air through antenna.

Meanwhile, the data signal and CATV/PCS signal split through 1.3/1.5 μm wavelength division multiplexer 421 in remote node 420 is split to each optical network unit 450, 451, 460 and each remote base station 440, 441, 460 by star coupler 436 of the remote node 420.

The CATV/PCS signal and data signal, divided by the 1.53/1.55 μm wavelength division multiplexer 461 of the optical network unit and remote base station, are converted into electrical signals by each receiver 470, 471.

Because the CATV signal and PCS signal occupy different frequency band, are divided split by bandpass filters 485, 486 and the CATV signal is transmitted to conventional twisted pair network and the PCS signal is transmitted to the air through antenna after being converted by frequency converter 475. The data signal is converted into the suitable format for the twisted pair network by the modulator/demodulator 481 and then transmitted to the twisted pair network.

Meanwhile, in the case of upstream transmission of signal for transmission of LMDS and WLL signal wavelength of 1.53 μm, for transmission of PCS signal wavelength of 1.3 μm, and for transmission of data signal wavelength of 1.55 μm is allocated respectively.

The 1.3/1.5 μm wavelength division multiplexer 462 is used as wavelength division multiplexer 462 of the optical network unit and remote base station and 1.3/1.5 μm two window directional coupler 422 is used as wavelength multiplxer 422 in remote node 420.

The upstream LMDS signal and WLL signal received through antenna are converted into the signal with lower frequency by the frequency converter 430 and then electrical-to-optical converted through transmitter 425. And LMDS/WLL signal converted into optical signal is transmitted to the central office/headend 400 through the 1.3/1.5 μm two window directional coupler 422.

Because only one wavelength is allocated for data service such as upstream cable modem service and ADSL, the data service such as upstream cable modem service and ADSL is modulated/demodulated by modulator/demodulator 480, 481 in the optical network units 450, 451, 460 and transmitted to the central office/headend 400 after being time division multiplexed.

Although the upstream data service using time division multiple access method has an advantage of no optical beat interference noise occurred when several light sources are incident upon one optical-to-electrical converter, there is also a disadvantage of requiring additional equipment.

Another method for reducing optical beat interference noise is to use wavelength selected distributed feedback laser or light emitting diode with wide linewidth as light source for upstream transmission while using subcarrier multiple access method.

Although the wavelength selected distributed feedback laser has a disadvantage of high cost optical device, the light emitting diode has an advantage that optical beat interference noise can be greatly reduced.

And although the effect of reducing optical beat interference noise is lower than that of the wavelength selected distributed feedback laser, because the light emitting diode is low cost optical device the construction of economical network can be achieved.

The PCS upstream signal, received through antenna of the PCS local wireless base station, is first converted into the signal of low intermediate frequency by the frequency converter 476 and then converted into optical signal by 1.3 μm light emitting diode.

As previously described, the deterioration of the signal caused by optical beat interference noise can be reduced by using light emitting diode with wide linewidth as light source for the PCS upstream transmission.

The LMDS/WLL signal, data signal and PCS signal, multiplexed by wavelength division multiplexer 462 and 1.3/1.5 μm two window directional coupler 422, are demultiplexed by wavelength division multiplexer 419 of the central office/headend 400. The wavelength division multiplexer 419 of the central office/headend is composed of 1.3/1.5 μm wavelength division multiplexer and 1.53/1.55 μm wavelength division multiplexer.

The demultiplexed upstream signal through wavelength division multiplexer 419 is converted into electrical signal by using optical receivers 415, 416, 417.

Figure 5:
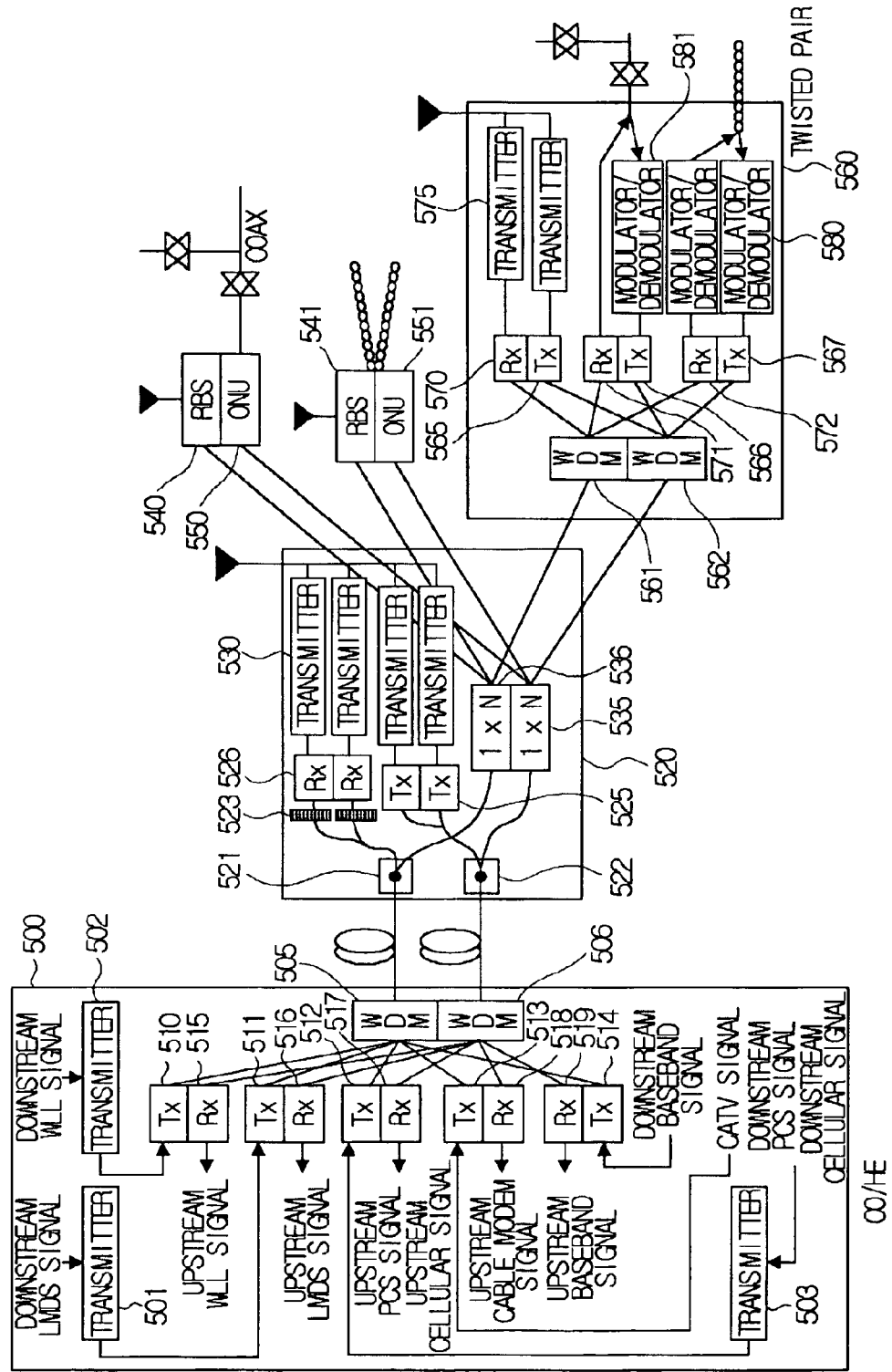
FIG. 5 is a node block compositional drawing of a multi-purpose optical fiber access network according to a second embodiment of the present invention.

FIG. 5 is a node block compositional drawing of a multi-purpose optical fiber access network according to a second embodiment of the present invention. FIG. 5 shows the case of being composed by using five wavelengths.

The LMDS signal and WLL signal use the same light source and the CATV signal and downstream PCS signal use the same light source in the first embodiment of FIG. 4. Also, the upstream data signal such as the ADSL upstream service and cable modem service uses the same light source in the FIG. 4. From the embodiment of FIG. 4, there is disadvantage that the independency between several access services is not guaranteed.

The embodiment of FIG. 5 complements the disadvantage by adding two wavelengths.

In upstream transmission of signal for transmission of LMDS signal wavelength of 1.56 μm, for transmission of WLL signal wavelength of 1.58 μm, for transmission of PCS signal wavelength of 1.54 μm, for transmission of CATV signal wavelength of 1.3 μm and for transmission of data signal wavelength of 1.52 μm is allocated respectively.

The wavelength division multiplexer 505 and wavelength division demultiplexer 506 of central office/headend 500 is composed of 1.3/1.5 μm wavelength division multiplexer and 4 channel wavelength division multiplexing cassette: 1.52 μm, 1.54 μm, 1.56 μm, 1.58 μm.

On the contrary to the embodiment of FIG. 4 the LMDS service and WLL service is transmitted by different light source each other in the case of downstream transmission. The LMDS signal and WLL signal, converted into intermediate frequency by frequency converters 501, 502, are transmitted to radio port 520 after being electrical-to-optical converted through each transmitter 511, 510.

Meanwhile, the downstream signal, divided by coupler 521 of radio port 520, is divided by optical filter 523 suitable for wavelengths of LMDS signal and WLL signal respectively and converted into electrical signal by optical receiver 526 and then transmitted to the air after being converted into aerial frequency through frequency converter 530.

On the contrary to the embodiment of FIG. 4, also downstream CATV signal and PCS signal are transmitted by different light source each other. The wavelength division multiplexed downstream CATV signal and PCS signal is split to optical network unit and PCS local wireless base station through coupler 521 and 1×N star coupler 536.

The CATV signal and PCS signal, demultiplexed through wavelength division multiplexer 561, are optical-to-electrical converted by receiver 571, 570 respectively and the PCS signal is transmitted to the air after being converted into aerial frequency by frequency converter 575 and the CATV signal is transmitted to the conventional twisted pair network without frequency conversion. Meanwhile data service is transmitted by the same method of FIG. 4.

In the case of upstream transmission of signal, for transmission of LMDS signal wavelength of 1.56 μm, for transmission of WLL signal wavelength of 1.58 μm, for transmission of PCS signal wavelength of 1.3 μm, for transmission of cable modem signal wavelength of 1.54 μm and for transmission of data signal wavelength of 1.52 μm is allocated respectively.

The upstream LMDS signal and WLL signal are electrical-to-optical converted by each transmitter 525 and then transmitted to central office/headend 500 after being multiplexed through coupler 522. The upstream signal, received in the central office/headend 500, is demultiplexed by using wavelength division multiplexer 506 and each demultiplexed access signal is converted into electrical signal by receivers 515, 517, 518, 519.

The upstream PCS signal is transmitted by the same method of the embodiment of FIG. 4. As previously described in the embodiment of FIG. 4, the light emitting diode is used as light source 565 of PCS local wireless base station in order to avoid optical beat interference noise occurred when light sources of several PCS local wireless base stations are incident upon one receiver 517.

Meanwhile, as the upstream cable modem signal and data signal such as ADSL are transmitted by light sources with different wavelengths, on the contrary to the embodiment of FIG. 4, independency between two signals is guaranteed and multiplexing two signals is needless.

The upstream cable modem signal and data signal such as ADSL are converted by modulator/demodulator 581, 580 respectively to be suitable for transmission with time division multiple access method and then transmitted to the central office/headend 500 through transmitter 566, 567.

The cable modem signal and data signal are transmitted by using time division multiple access method as the embodiment of FIG. 4. Accordingly, the deterioration of signal by said optical beat interference noise is not occurred.

As a result, the embodiment of FIG. 5 added two wavelengths to the embodiment of FIG. 4. As compared with FIG. 4, the LMDS signal and WLL signal are transmitted by light sources of different wavelengths, the downstream CATV signal and PCS signal are transmitted by light sources of different wavelengths and the upstream cable modem signal and data signal are transmitted by light sources of different wavelengths. By doing so, independency of each access service is still more guaranteed.

Figure 6:
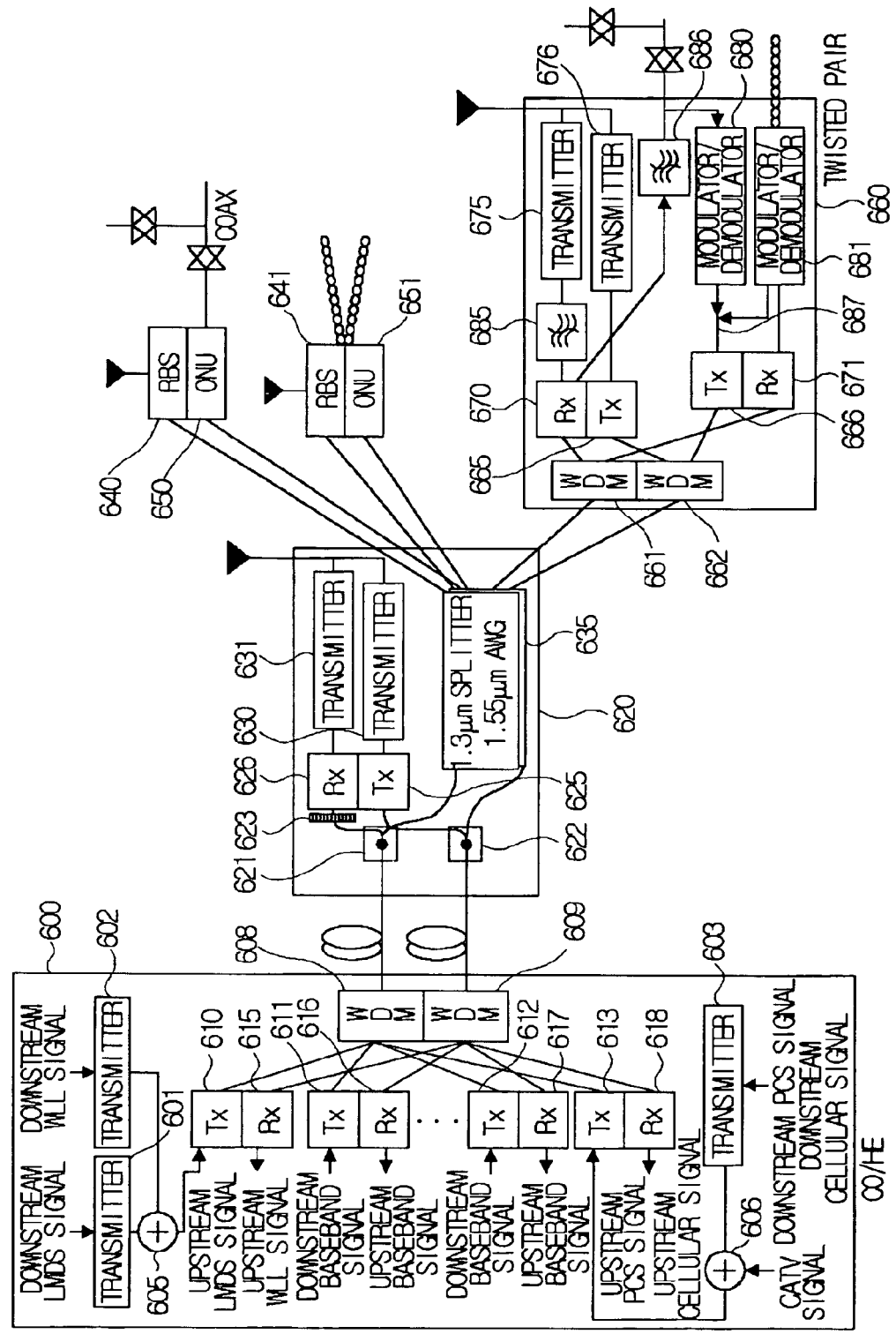
FIG. 6 is a node block compositional drawing of a multi-purpose optical fiber access network according to a third embodiment of the present invention.

FIG. 6 is a node block compositional drawing of a multi-purpose optical fiber access network according to the third embodiment of the present invention. For LMDS and WLL service one wavelength is allocated, for CATV and PCS service another wavelength is allocated and for transmission of data signal several wavelengths are allocated.

The difference between the embodiments of FIG. 4 and FIG. 6 is that data signal is transmitted to optical network units 650, 651, 660 by wavelength division multiple access. Accordingly, the central office/headend should equip with N light sources of different wavelengths in order to transmit data signal to N optical network units and each optical unit should equip with wavelength selected distributed feedback laser as light source for transmission of upstream data signal.

For example, in downstream signal transmission, for LMDS and WLL wavelength of 1.53 μm, for CATV and PCS wavelength of 1.3 μm, and for transmission of data signal wavelength of 1.55 μm is used respectively.

The LMDS service and WLL service are multiplexed by using subcarrier multiplexing method as the embodiment of FIG. 4 and electrical-to-optical converted through a transmitter 610. And also the CATV service and PCS service are multiplexed by using subcarrier multiplexing method and electrical-to-optical converted through a transmitter 613.

The LMDS/WLL signal, dropped by coupler 621 of remote node 620, is selected by bandpass filter 623 and then transmitted to the air through frequency converter 631 after being optical-to-electrical converted by receiver 626.

Meanwhile, the downstream baseband data signal is transmitted by several wavelength selected light sources 611, 612. The data signal, converted into optical signal, is multiplexed by wavelength division multiplexer 608 of central office/headend and then dropped to each optical network units 650, 651, 660 by coupler 621 and 1.3 $\mu$m splitter/1.55 $\mu$m arrayed waveguide grating 635.

Herein, 1.3 $\mu$m splitter/1.55 $\mu$m arrayed waveguide grating 635 is a device functioning as splitter for input signal of 1.3 $\mu$m light source and as arrayed waveguide grating for light source of 1.55 $\mu$m band.

Accordingly, meanwhile the CATV/PCS signal, transmitted by 1.3 $\mu$m light source, is identically transmitted to all optical network units, in the of data service, transmitted by several light sources of 1.55 $\mu$m band, according to the characteristic of arrayed waveguide grating of 1.3 $\mu$m splitter/1.55 $\mu$m arrayed waveguide grating 635 the information carried in different wavelengths is transmitted to each optical network unit.

The 1.3/1.5 $\mu$m wavelength division demultiplexer is used as wavelength division demultiplexer 661 of optical network unit.

The signal processing in the optical network unit is equal to the embodiment of FIG. 4.

Meanwhile, in the case of upstream transmission of signal for LMDS and WLL service wavelength of 1.53 $\mu$m, for PCS wavelength of 1.3 $\mu$m, and for transmission of data signal several wavelengths of 1.55 $\mu$m is allocated respectively.

The 1.3/1.5 $\mu$m wavelength division multiplexer is used as wavelength division multiplexer of optical network unit and 1.3/1.5 $\mu$m directional coupler is used as coupler 622 of remote node 620 as the embodiment of FIG. 4.

Because the embodiment of FIG. 6 differs in that data service is provided by wavelength division multiple access method as compared with the embodiment of FIG. 4, the wavelength selected distributed feedback laser is used as light source of optical network unit for data transmission. And because the data service such as upstream cable modem and ADSL is not transmitted by time division multiple access method, the time division multiplexer 487 in FIG. 4 is not required.

As a result, the embodiment of FIG. 6 utilized wavelength division multiple access instead of time division multiple access and therefore there is an advantage that more data information can be transmitted.

Figure 7:
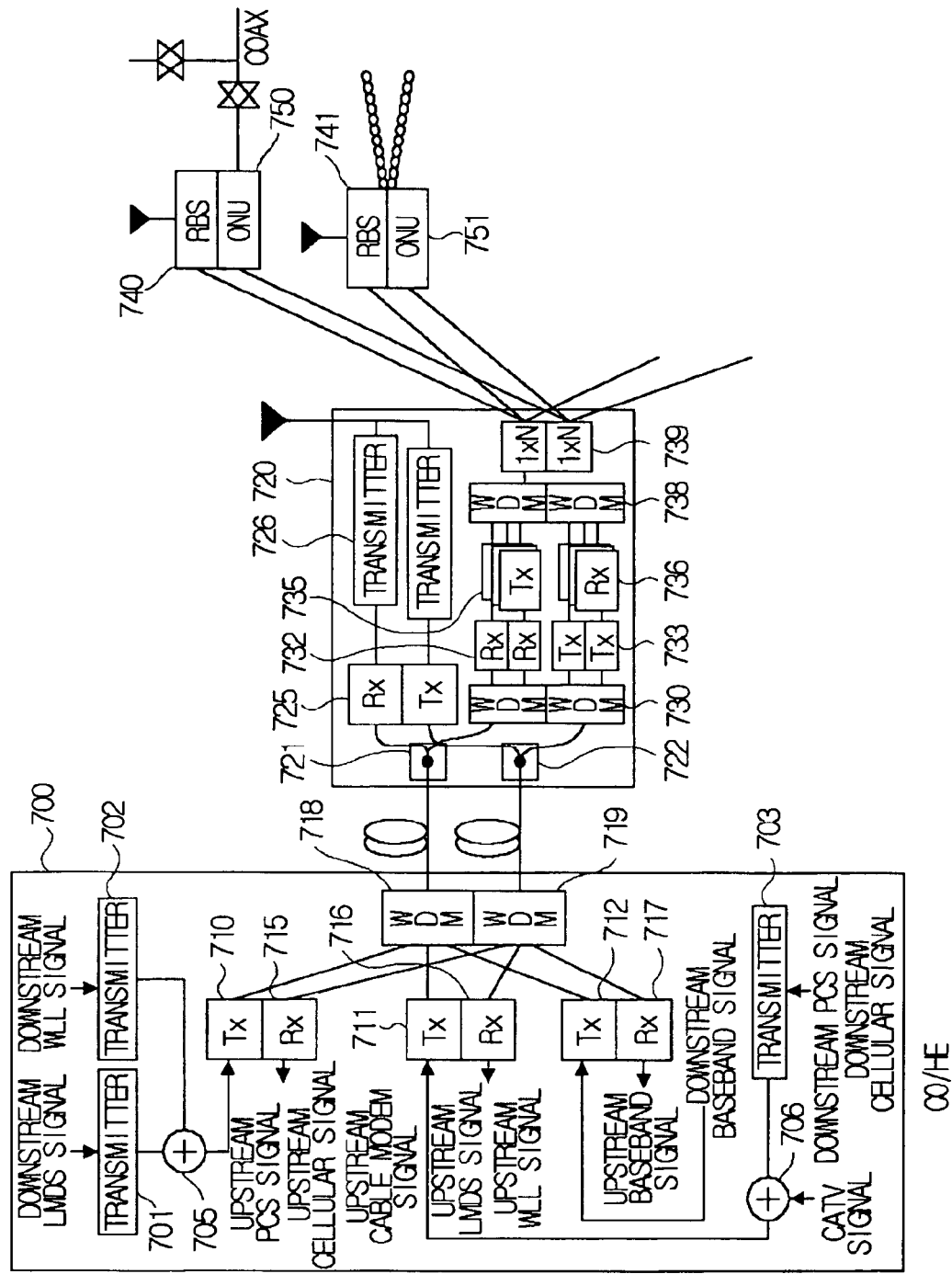
FIG. 7 is a node block compositional drawing of a multi-purpose optical fiber access network according to a fourth embodiment of the present invention.

FIG. 7 is a node block compositional drawing of a multi-purpose optical fiber access network according to fourth embodiment of the present invention. FIG. 7 shows the case of being composed by using three wavelengths as the case of FIG. 4.

First, in downstream signal transmission, for transmitter 710 for LMDS and WLL wavelength of 1.3 $\mu$m, for transmitter 711 for CATV and PCS wavelength of 1.53 $\mu$m, and for transmitter 712 for transmission of data signal wavelength of 1.55 $\mu$m is used respectively.

The wavelength division multiplexer 718 of central office/headend 700 is composed of 1.53/1.55 $\mu$m wavelength division multiplexer and 1.3/1.5 $\mu$m wavelength division multiplexer as the embodiment of FIG. 4. And 1.53/1.55 $\mu$m wavelength division demultiplexer is used as splitting/combining device 721 of remote node 720.

The LMDS/WLL signal out of the downstream signals, multiplexed by wavelength division multiplexer 718 of central office/headend 700 is divided by wavelength division demultiplexer 721 of remote node 720 and converted into electrical signal through optical receiver 725 and then transmitted to the air. Meanwhile, the CATV/PCS signal and data signal are split by wavelength division demultiplexer and then converted into optical-to-electrical converted by receiver 732.

The CATV signal and PCS signal, converted into electrical signal, is electrically divided and then transmitted to optical network unit 750, 751, 760 and PCS wireless base station 740, 741, 760 after being converted into optical signal by using light sources. Herein, the CATV signal, PCS signal and data signal uses light sources with wavelengths 1.53 $\mu$m, 1.3 $\mu$m and 1.55 $\mu$m respectively.

The flow of downstream signal in the optical network unit and PCS wireless base station is equal to the embodiment of FIG. 5.

Because optical-to-electrical conversion and electrical-to-optical conversion is done in remote node 720, there is a disadvantage of requiring additional light source as compared with the embodiment of FIG. 4.

However, because optical signal is converted into electrical signal in remote node 720, there are advantages that insertion of other signals, for example control/observation signal or other services, is easy and signal can be electrically amplified.

Meanwhile, in the case of upstream transmission of signal for transmission of PCS service as light source of PCS wireless base station 740, 741, 760 wavelength of 1.3 $\mu$m band, for transmission of cable modem signal as light source of optical network unit 750, 751, 760 wavelength of 1.55 $\mu$m band, and for transmission of data signal as light source wavelength of 1.53 $\mu$m is allocated respectively.

The upstream data signal is time division multiplexed by modulator/demodulator 780 and then transmitted to central office/headend 700 as the embodiment of FIG. 4.

The upstream PCS signal, multiplexed through wavelength division multiplexer 762 of optical network unit and PCS wireless base station, upstream cable modem signal and upstream data signal are added to the signal of other optical network unit and PCS wireless base station in star coupler 739 of remote node 720 and then converted into electrical signal by optical receiver 736 of remote node.

The upstream PCS signal and upstream cable modem signal, converted into electrical signal, are electrically multiplexed in remote node 720 and electrical-to-optical converted by 1.53 $\mu$m transmitter 733 and then transmitted to central office/headend 700.

Meanwhile, the LMDS/WLL signal is electrical-to-optical converted by 1.3 $\mu$m transmitter. The 1.3/1.5 $\mu$m wavelength division multiplexer is used as wavelength division multiplexer 722 of remote node 720 for upstream signal transmission.

As a result, the embodiment of FIG. 7 is equipped with optical-to-electrical and electrical-to-optical converter in remote node 720 therefore there is an advantage that the wavelength, used for LMDS/WLL service, can be used between remote node 720 and optical network unit 750, 751, 760.

Figure 8:
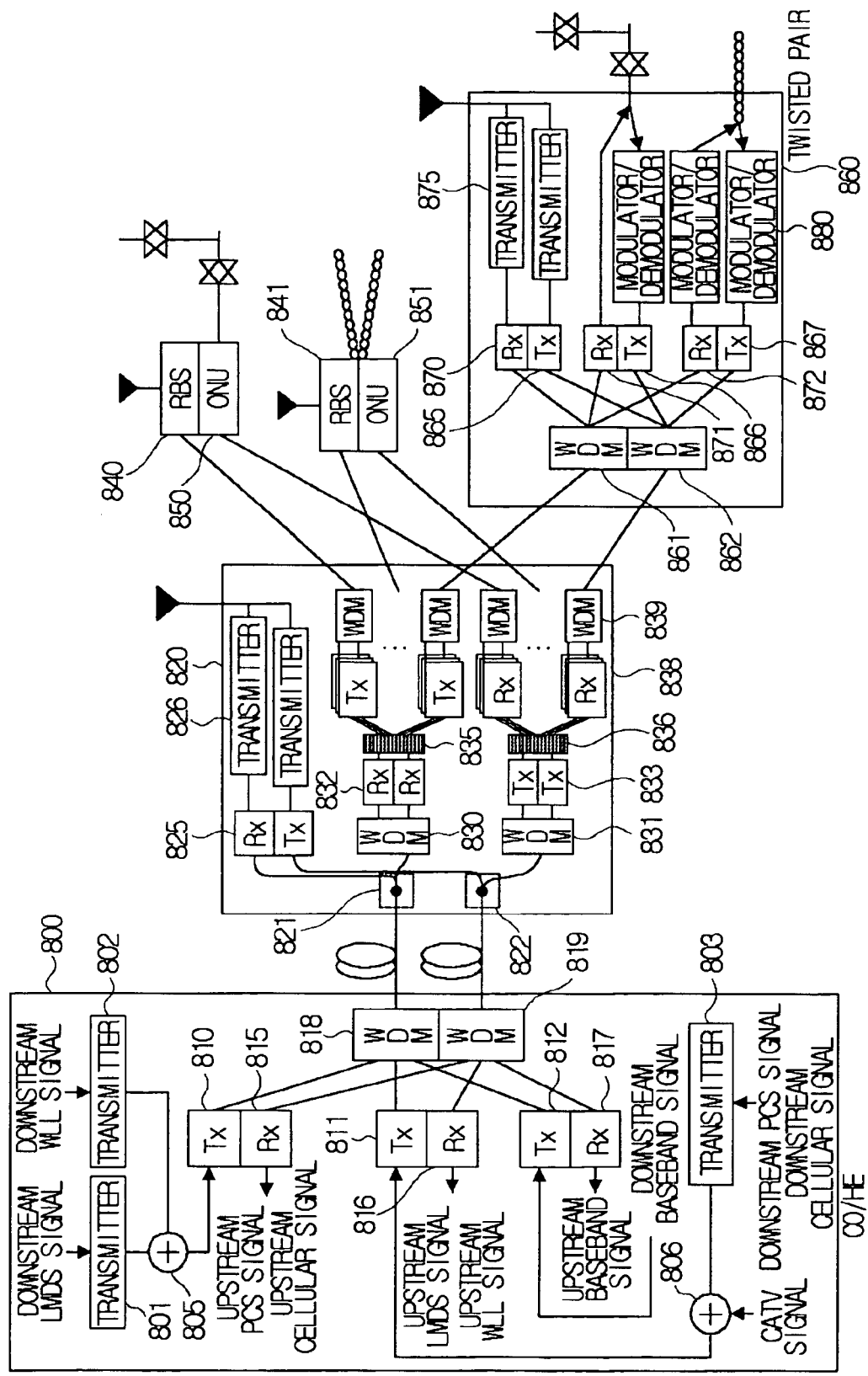
FIG. 8 is a node block compositional drawing of a multi-purpose optical fiber access network according to a fifth embodiment of the present invention.

FIG. 8 is a node block compositional drawing of a multi-purpose optical fiber access network according to fifth embodiment of the present invention. FIG. 8 shows the case of being composed by using three wavelengths as the case of FIG. 4.

The embodiment of FIG. 8 has a disadvantage that electrical-to-optical and optical-to-electrical converters corresponding to the number of optical network units and PCS wireless base stations are required in remote node 820.

However, there are several advantages that optical beat interference noise is not occurred and time for upstream transmission of data signal time division multiplexer, required for each optical network unit, is required for only remote node.

First, in downstream signal transmission, for LMDS and WLL wavelength of 1.3 μm, for CATV and PCS wavelength of 1.53 μm, and for transmission of data signal wavelength of 1.55 μm is used respectively.

The downstream signal, multiplexed by wavelength division multiplexer 818 of central office/headend 800, is divided to LMDS/WLL signal, CATV/PCS and data signal through 1.3/1.5 μm wavelength division demultiplexer 821 of remote node 820.

And the divided CATV/PCS and data signal are divided by wavelength division demultiplexer 830.

Also, CATV/PCS signal is optical-to-electrical converted and then electrically divided through demultiplexer 835. Herein, the demultiplexer 835 not only electrically divide CATV signal and PCS signal but also suitably split PCS signal and data signal to each optical network unit and PCS wireless base station.

The divided signal is transmitted as light source of 1.3 μm wavelength for CATV signal, as light source of 1.53 μm wavelength for PCS signal and as light source of 1.55 μm wavelength and then being electrical-to-optical converted to optical network units 850, 851, 860 and PCS local base stations 840, 841, 860.

The flow of downstream signal is equal to case of the embodiment of FIG. 5.

Meanwhile, in the case of upstream transmission of signal, for transmission of PCS service from optical network unit 850, 851, 860 and PCS local base station 840, 841, 860 wavelength of 1.3 μm, for cable modem wavelength of 1.55 μm and for data signal wavelength of 1.53 μm is used respectively.

The upstream PCS signal and cable modem signal and data signal are divided by wavelength division demultiplexer 839 of remote node 820 and then converted into electrical signal through receiver 838. Herein, the wavelength division demultiplexer 839 of remote node 820 is composed of 1.3/1.5 μm wavelength division demultiplexer and 1.53/1.55 μm wavelength division demultiplexer and this composition is equal to the composition of wavelength division demultiplexer 819 of central office/headend 800.

The cable modem signal and PCS signal, optical-to-electrical converted in remote node 820, is electrically multiplexed by multiplexer 836 and electrical-to-optical converted into light source with 1.55 μm wavelength and then transmitted to central office/headend 800. And the data signal is electrically multiplexed by multiplexer 836 and electrical-to-optical converted into light source with 1.53 μm wavelength and then transmitted to central office/headend 800.

Meanwhile, the LMDS/WLL upstream signal is transmitted to central office/headend 800 by using light source with 1.3 μm wavelength.

As a result, because the embodiment of FIG. 8 is equipped with optical-to-electrical and electrical-to-optical converters corresponding to the number of optical network units and PCS wireless base stations in remote node 820 and electrically multiplex the upstream signal of optical network units and PCS wireless base stations, there are advantages that optical beat interference noise is not occurred and time division multiplexer is not required for each optical network unit.

As previously described in detail, a multi-purpose optical fiber access network of the present invention can accept not only presently used various kinds of services but also new services being developed from now on. Therefore, there is no need to newly construct optical fiber access network when new services are developed.

Also, a multi-purpose optical fiber access network of the present invention greatly contributes to improvement of competitive power of communication and broadcasting service provider.

Although, a multi-purpose optical fiber access network of the present invention was described on the basis of preferably embodiments, these embodiments do not limit the present invention but exemplify. Also, it will be appreciated by those skilled in the art that changes and variations in the embodiments herein can be made without departing from the spirit and scope of the present invention as defined by the following claims.

What we claim:

1. A multi-purpose optical fiber access network capable of accepting access services provided by a hybrid wireline/wireless access network, the optical fiber access a network comprising:

(a) a central office/headend configured to generate optical wavelengths for the access services, allocate the optical wavelengths to corresponding access services, multiplex the optical wavelengths for the respective access services and transmit the multiplexed optical wavelengths signals to a first downstream optical fiber, and convert signals received from a first upstream optical fiber into electrical signals after splitting the received signals; and (b) a remote node, connected with a plurality of remote base stations and optical network units, the remote node configured to split the multiplexed optical wavelengths received from the first downstream optical fiber into signals according to wireline/wireless access service and transmit wireless signals through an antenna after opto-electric conversion and transmit wireline signals to the remote base stations and optical network units through corresponding second downstream optical fibers, and convert wireless access service signals received from the antenna into optical signals and multiplex the received wireless service signals with signals received from the remote base stations and optical network units through corresponding second upstream optical fibers and transmit the multiplexed signals to the central office/headend through the first upstream optical fiber, wherein (i) each of the plurality of remote base stations is arranged adjacent to one of the plurality of optical network units;

(ii) each remote base station and its adjacent optical network unit jointly own one of the second downstream optical fibers, one of the second upstream optical fibers, a first wavelength division multiplexer and a second wavelength division multiplexer;

(iii) the first wavelength division multiplexer is configured to split the signals received from the jointly owned second downstream optical fiber and transmit the split signals to a receiver of each of the remote base stations and its respective optical network unit; and (iv) the second wavelength division multiplexer is configured to multiplex signals received from the remote base stations and its respective optical network unit and transmit the multiplexed signals to the remote node through the jointly owned second upstream optical fiber.

2. The multi-purpose optical fiber access network of claim 1, wherein the central office/headend includes (i) first, second and third transmitters which respectively generate a first allocated wavelength for LMDS service and WLL service, a second allocated wavelength for CATV service and PCS service and a third allocated wavelength for data services;

(ii) a third wavelength division multiplexer configured to multiplex the generated wavelengths for each respective access service and forward the multiplexed wavelengths to the remote node through the first downstream optical fiber;

(iii) a fourth wavelength division multiplexer configured to split signals received from the remote node through the first upstream optical fiber; and (iv) optical receivers configured to convert the received signals into electrical signals;

wherein the remote node includes (i) a first splitting means for splitting the wavelengths received from the central office/headend into signals according to the respective allocated wavelength;

(ii) a wireless transmitter section configured to convert the LMDS/WLL signals among the split signals into electrical signals, convert the electrical signals of the wireless transmitter section into wireless signals and transmit the wireless signals through the antenna;

(iii) a second splitting means for transmitting the CATV/PCS signal and the data signals among the split signals to each of the optical network units and each of the remote base stations;

(iv) a wireless receiver section configured to convert LMDS/WLL signals received through the antenna into signals at a lower frequency and convert the lower frequency signals into optical signals;

(v) a second combining means for receiving several optical signals from each of the remote base stations and each of the optical network units; and (vi) a first combining means for receiving the optical signals from the wireless receiver section and the optical signals from the second combining means and transmitting the optical signals of the first combining means to the central office/headend through the first upstream optical fiber.

3. The multi-purpose optical fiber access network of claim 1, wherein the central office/headend includes (i) first, second, third, fourth and fifth transmitters which respectively generate a first allocated wavelength for LMDS service, a second allocated wavelength for WLL service, a third allocated wavelength for CATV service, a fourth allocated wavelength for PCS service and a fifth allocated wavelength for data services;

(ii) a third wavelength division multiplexer configured to multiplex the generated wavelengths for each respective access service and forward the multiplexed wavelengths to the remote node through the first downstream optical fiber;

(iii) a fourth wavelength division multiplexer configured to split signals received from the remote node through the first upstream optical fiber; and (iv) optical receivers configured to convert the received signals into electrical signals;

wherein the remote node includes (i) a first splitting means for splitting the wavelengths received from the central office/headend into signals according to the respective allocated wavelength;

(ii) optical filters configured to divide the split signals into LMDS signals and WLL signals respectively;

(iii) a wireless transmitter section configured to convert the LMDS signals and the WLL signals into electrical signals and convert the electrical signals of the wireless transmitter section into wireless signals and transmit the wireless signals through the antenna;

(iv) a second splitting means for transmitting the CATV signals, PCS signals and the data signals among the split signals to each of the optical network units and each of the remote base stations;

(v) a wireless base receiver section configured to convert LMDS signals and WLL signals received through the antenna into signals at a lower frequency and convert the lower frequency signals into optical signals;

(vi) a second combining means configured to receive several optical signals from each of the remote base stations and the optical network units; and (vii) a first combining means for receiving the optical signals from the wireless receiver section and the optical signals from the second combining means and transmitting the optical signals of the first combining means to the central office/headend through the first upstream optical fiber.

4. The multi-purpose optical fiber access network of claim 1, wherein the central office/headend includes (i) a plurality of transmitters which respectively generate a first allocated wavelength for LMDS service and WLL service, a second allocated wavelength for CATV service and PCS service and a plurality of allocated wavelengths for data services;

(ii) a third wavelength division multiplexer configured to multiplex the generated wavelengths for each respective access service and forward the multiplexed wavelengths to the remote node through the first downstream optical fiber;

(iii) a fourth wavelength division multiplexer configured to split signals received from the remote node through the first upstream optical fiber; and (iv) optical receivers configured to convert the received signals into electrical signals;

wherein the remote node includes (i) a first splitting means for splitting the wavelengths received from the central office/headend into signals according to the respective allocated wavelength;

(ii) a bandpass filter configured to select the LMDS signal and the WLL signal;

(iii) a wireless transmitter section configured to convert the selected LMDS/WLL signals into electrical signals and convert the electrical signals of the wireless transmitter section into wireless signals and transmit the wireless signals through the antenna;

(iv) a second splitting means for transmitting the CATV/PCS signals and the data signals among the split signals to each of the optical network units and each of the remote base stations;

(v) a wireless receiver section configured to convert LMDS/WLL signals received through the antenna into signals at a lower frequency and convert the lower frequency signals into optical signals;

(vi) a second combining means for receiving several optical signals from each of the remote base stations and the optical network units; and (vii) a first combining means for receiving the optical signals from the wireless receiver section and the optical signals from the second combining means and transmitting the optical signals of the first combining means to the central office/headend through the first upstream optical fiber; and wherein each of the optical network units uses a wavelength selected distributed feedback laser as light source for upstream data transmission.

5. The multi-purpose optical fiber access network of claim 1, wherein the central office/headend includes (i) first, second and third transmitters which respectively generate a first allocated wavelength for LMDS service and WLL service, a second allocated wavelength for CATV service and PCS service and a third allocated wavelength for data services;

(ii) a third wavelength division multiplexer configured to multiplex the generated wavelengths for each respective access service and forward the multiplexed wavelengths to the remote node through the first downstream optical fiber;

(iii) a fourth wavelength division multiplexer configured to split signals received from the remote node through the first upstream optical fiber; and (iv) optical receivers configured to convert the received signals into electrical signals;

wherein the remote node includes (i) a first splitting means for splitting the wavelengths received from the central office/headend into signals according to the respective allocated wavelength;

(ii) a wireless transmitter section configured to convert the LMDS/WLL signals among the split signals into electrical signals, convert the electrical signals of the wireless transmitter section into wireless signals and transmit the wireless signals through the antenna;

(iii) a second splitting means for converting the CATV/PCS signals and the data signals among the split signals into electrical signals;

(iv) a first converter configured to convert the CATV signals, the PCS signals and the data signals from the second splitting means into optical signals by using a wavelength corresponding to the respective access service;

(v) a third splitting means for transmitting the signals from the second splitting means to each of the optical network units and each of the remote base stations;

(vi) a wireless receiver section configured to convert LMDS/WLL signals received through the antenna into signals at a lower frequency and convert the lower frequency signals into optical signals;

(vii) a second combining means for receiving CATV/PCS/data signals received from each of the remote base stations and each of the optical network units through the second upstream optical fiber;

(viii) a second converter configured to convert the CATV/PCS/data signals from the second combining means into electrical signals, respectively;

(ix) a third converter configured to multiplex the CATV/PCS signals from the second converter and convert the multiplexed CATV/PCS signals into optical signals and convert the data signals from the second converter into optical signals; and (x) a first combining means for receiving the optical signals from the wireless receiver section and the third converter and transmitting the signals of the first combining means to the central office/headend through the first upstream optical fiber.

6. The multi-purpose optical fiber access network of claim 1, wherein the central office/headend includes (i) first, second and third transmitters which respectively generate a first allocated wavelength for LMDS service and WLL service, a second allocated wavelength for CATV service and PCS service and a third allocated wavelength for data services;

(ii) a third wavelength division multiplexer configured to multiplex the generated wavelengths for each respective access service and forward the multiplexed wavelengths to the remote node through the first downstream optical fiber;

(iii) a fourth wavelength division multiplexer configured to split signals received from the remote node through the first upstream optical fiber; and (iv) optical receivers configured to convert the received signals into electrical signals;

wherein the remote node includes (i) a first splitting means for dividing the wavelengths received from the central office/headend into LMDS/WLL signals, CATV/PCS signals, and data signals;

(ii) a wireless transmitter section configured to convert the LMDS/WLL signals among the divided signals into electrical signals, convert the electrical signals of the wireless transmitter section into wireless signals and transmit the wireless signals through the antenna;

(iii) a second splitting means for dividing the signals received from the first splitting means into CATV/PCS signals and the data signals and converting the split signals of the second splitting means into electrical signals;

(iv) a demultiplexer configured to electrically divide the CATV signal and the PCS signal received from the second splitting means and split the PCS signal and the data signals received from the second splitting means into a signals suitable for each of the remote base stations and the optical network units;

(v) first converters configured to convert signals from the demultiplexer into optical signals, the first converters corresponding to one of the remote base stations and the optical network units;

(vi) a plurality of third splitting means each for transmitting the signals received from each of the first converters to each of the optical network units and each of the remote base stations;

(vii) a wireless receiver section configured to convert LMDS/WLL signals received through the antenna into signals at a lower frequency and convert the lower frequency signals into optical signals;

(viii) a plurality of second combining means each for receiving the CATV/PCS/data signals from each of the remote base stations and each of the optical network units;

(ix) second converters configured to convert signals from each of the second combining means into electrical signals;

(x) a multiplexer configured to multiplex each signal from each of the second converters, convert CATV/PCS signals and data signals into optical signals by using a different wavelength; and (xi) a first combining means for receiving the optical signals from the multiplexer and the wireless receiver section and transmitting the optical signals of the first combining means to the central office/headend through the first upstream optical fiber.

* * * * *